Figure 1:
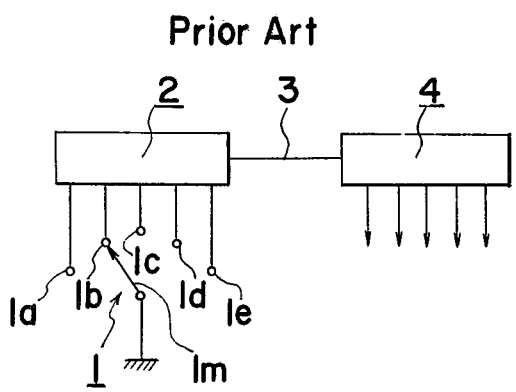

United States Patent [19]

Ohashi et al.

[11] 4,070,650
[45] Jan. 24, 1978

[54] DIGITAL SIGNAL TRANSMISSION SYSTEM AND EQUIPMENT

[75] Inventors: Hiroshi Ohashi, Aichi; Takashi Kimura, Nagoya, both of Japan

[73] Assignee: Kabushiki Kaisha Tokai Rika Denki Seisakusho, Japan

[21] Appl. No.: 687,914

[22] Filed: May 19, 1976

[30] Foreign Application Priority Data

May 29, 1975 Japan .................................. 50-63544

[51] Int. Cl.$^2$ ........................... H03K 5/20; H04J 3/00; H04Q 9/06
[52] U.S. Cl. ............................... 340/172; 179/15 BL; 328/147; 340/355; 340/413
[58] Field of Search ........ 340/150, 151, 172, 177 VA, 340/182, 183, 184, 207, 349, 355, 409, 413; 179/15 A, 15 BL; 328/115, 146, 147, 151

[56] References Cited

U.S. PATENT DOCUMENTS

| | | | |
|---|---|---|---|
| 3,120,758 | 2/1964 | Craddock et al. | 340/413 UX |
| 3,535,458 | 10/1970 | Gottfried et al. | 179/15 BL |
| 3,718,925 | 2/1973 | Donn et al. | 340/413 |
| 3,758,867 | 9/1973 | Schulz | 328/147 X |
| 3,902,127 | 8/1975 | Wilson | 328/151 X |
| 3,940,759 | 2/1976 | Zitelli et al. | 179/15 BL X |
| 3,968,486 | 7/1976 | Gerdes | 340/347 AD |

Primary Examiner—Donald J. Yusko
Attorney, Agent, or Firm—Craig & Antonelli

[57] ABSTRACT

A digital signal transmission system and equipment therefor in which digital signals sequentially sent out from an encoder side are compared with set values in each of comparators at a decoder side, for sending out signals from the comparators when the values of the digital signals are larger than the values set in the comparators and for suspending signals from all of the comparators if the values of the digital signals are smaller than those set in the comparators, while output from the comparator having the set value nearest to the signal value is utilized for inverting other comparators so as to suspend outputs from these other comparators for effecting stable signal transmission through simple construction.

13 Claims, 10 Drawing Figures

Vd —— 7/8 Vcc
Vc —— 5/8 Vcc
Vb —— 3/8 Vcc
Va —— 1/8 Vcc

DIGITAL SIGNAL TRANSMISSION SYSTEM AND EQUIPMENT

The present invention relates to a signal transmission system and more particularly, to a transmission system for digital signals of multichannels and equipment therefor which are, for example, employed for transmitting on and off conditions of a plurality of switches to distant places through a single signal line.

There have conventionally been proposed various methods for transmitting a plurality of signals to distant places through a single signal line, of which multiplex communication systems through time division and frequency division are currently in practical use. In both of these systems, it is possible to transmit a plurality of signals simultaneously by raising repeating frequencies, with effect that the analog signals may be sent as well as the digital signals. Such conventional multiplex communications systems, however, have various disadvantages in that the whole equipment employed therefor tend to be of large scale with expensive coaxial cables employed, thus not only being far from an efficient means especially for transmitting small amount of information, but resulting in consequent high cost.

Figure 2:
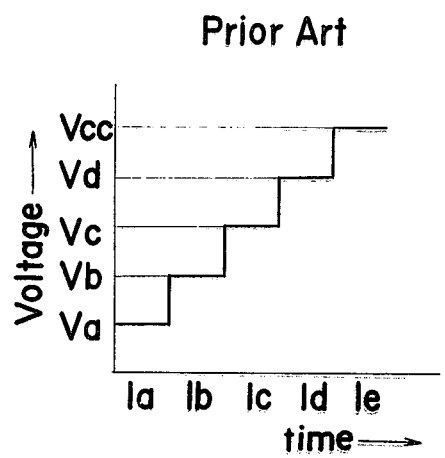

Incidentally, there has been known a system referred to as a voltage division system as shown in FIG. 1 for transmitting digital signal of comparatively small amount, such as turning on and off of a switch through a single signal line, which system utilizes differences in potential as information transmission means as described hereinbelow. In FIG. 1, voltages corresponding to positions $1a$ to $1e$ of a movable contact $1m$ of a rotary switch 1 are generated in a signal line 3 by switching over from one resistor (not shown) to another in an encoder 2 through rotation of the movable contact $1m$ of the rotary switch 1. When the movable contact $1m$ of the switch 1 is connected to the position or stationary contact $1b$ as in FIG. 1, voltage represented by $Vb$ in FIG. 2 is transmitted from the encoder 2 to a decoder 4 through the signal line 3. Accordingly, by identifying to which of the positions $1a$ to $1e$ the voltage $Vb$ corresponds at the decoder 4, the position of the movable contact $1m$ of the rotary switch 1 can be transmitted. The above described system, however, also has a serious disadvantage in that when the potential of the signal line 3 is intended to transmit information, it is impossible to increase the number of channels unless potential of more than two levels are simultaneously obtainable, although the number of the positions or stationary contacts may be increased. In other words, on the assumption that two or more switches are simultaneously turned on, it is quite impossible to detect the particular switches thus turned on. It is another disadvantage of the conventional transmission system of the above described type that synchronization is generally required between the encoder and decoder, with increased probability of faulty detection.

Accordingly, an essential object of the present invention is to provide a digital signal transmission system of multichannel type and equipment therefor which are capable of transmitting signals without necessity of synchronization between an encoder and a decoder and also without possibility of erroneous detection.

Another important object of the present invention is to provide a digital signal transmission system of the above described type and equipment therefor in which the whole equipment can be simplified in construction having sufficient resistance to noises, without requiring employment of expensive coaxial cables, with consequent low manufacturing cost.

A further object of the present invention is to provide a digital signal transmission system of the above described type and equipment therefor which are stable in functioning, with high reliability in actual use.

According to a preferred embodiment of the present invention, the digital signal transmission system is arranged to sequentially send out from an encoder side, digital signals whose voltages differ from each other, and to compare at a decoder side coupled to said encoder side, the voltage of said sequentially sent out digital signals with comparison set values which are different from each other and which are set in comparators provided in number corresponding to the number of said digital signals so that outputs are developed from all of the comparators when voltages of the comparison set values are lower than the voltages of said sequentially sent out digital signals, and that output from any one of said comparators having the comparison value nearest to said voltage of said digital signal inverts the others of said comparators for sequentially obtaining output only from the any one of said comparators. For effecting the above described functions, the equipment therefor includes a timing pulse generating circuit for sequentially developing pulse signals, a switching circuit to be turned on by said pulse signals from said timing pulse generating circuit for sequentially sending out digital signals having voltages different from each other, a level discriminating circuit which has comparators provided in number corresponding to the number of said digital signals, and a holding output circuit coupled to said level discriminating circuit for energizing loads through signals from said holding output circuit, by which arrangement necessity of synchronization between an encoder and a decoder is eliminated without possibility of errorneous detection, with simplification of construction and improved resistance to noises, thus digital signal transmission system and equipment therefor which have stable functioning and high reliability being presented at low manufacturing cost.

Figure 3:
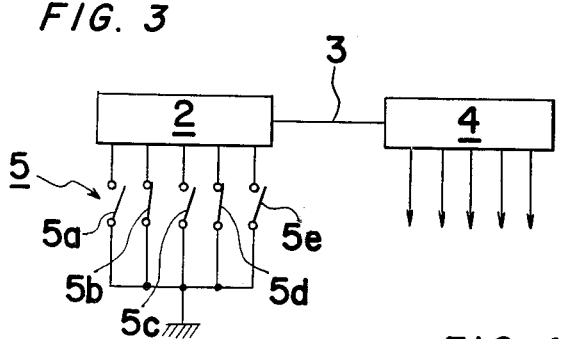
Figure 4:
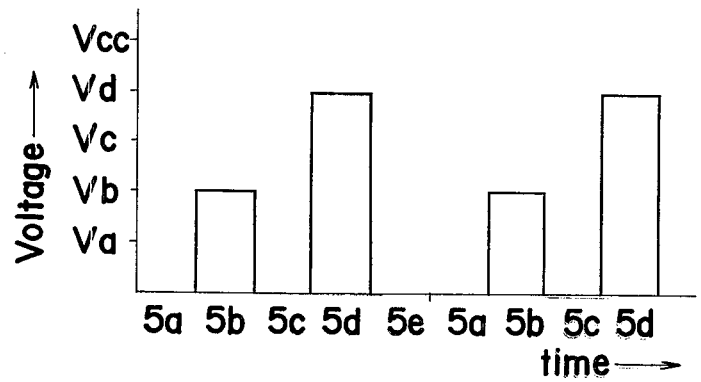
Figure 4:
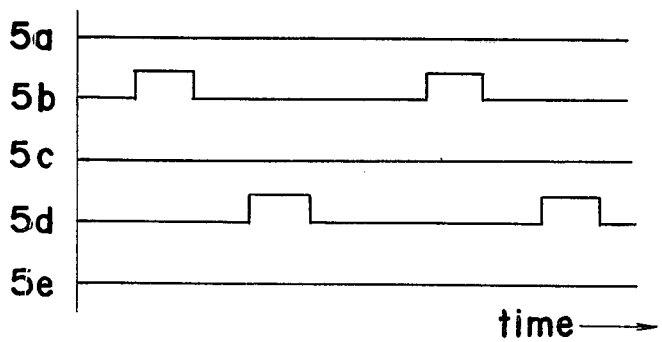
Figure 5:
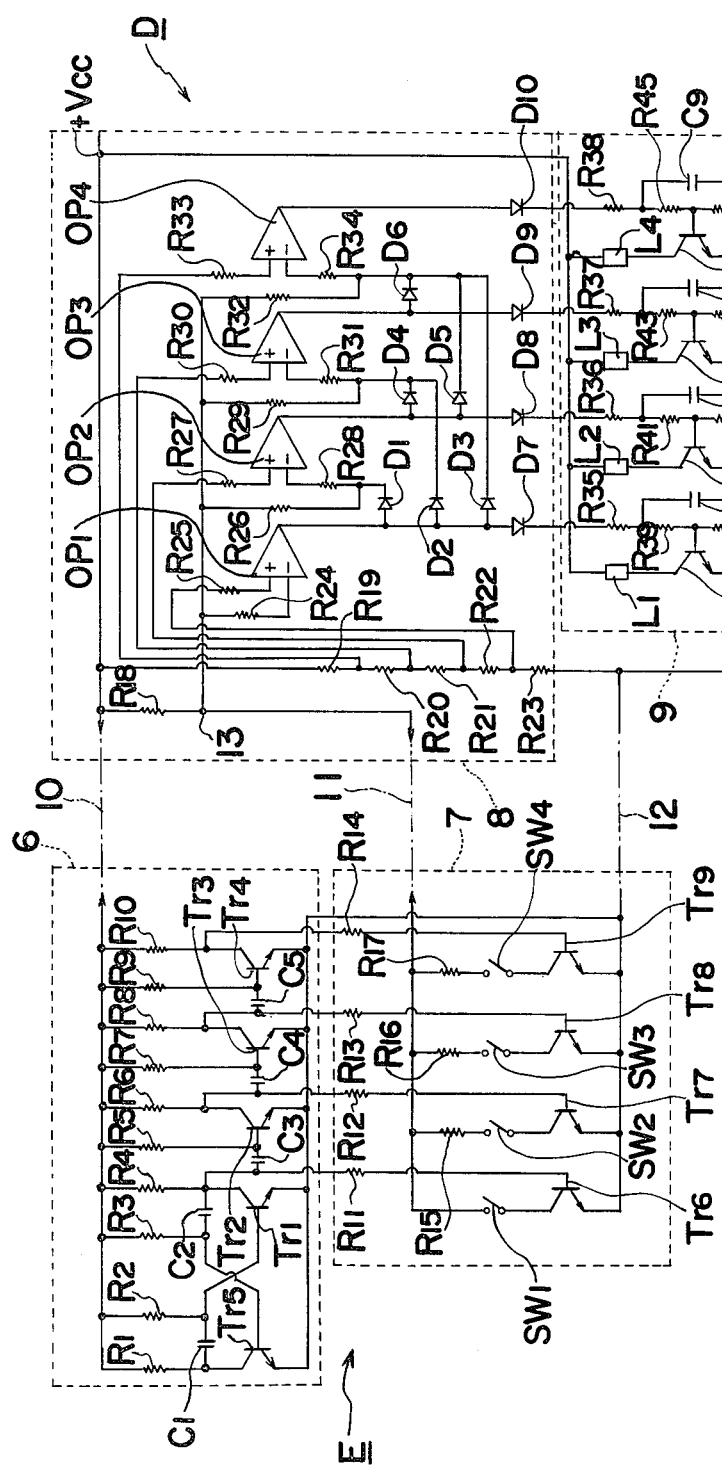
Figure 6:
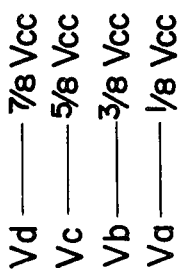
Figure 6:
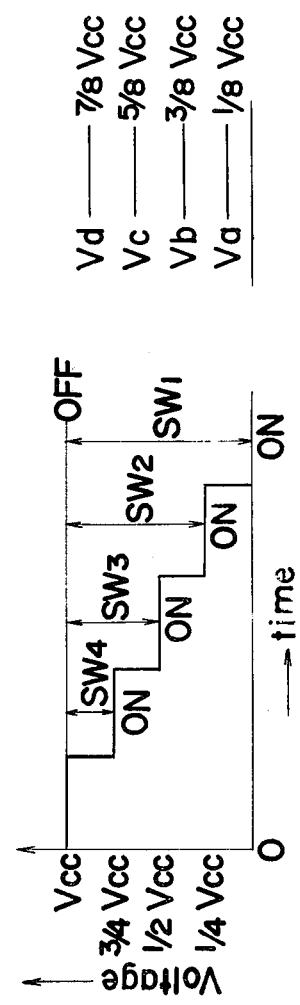
Figure 7:
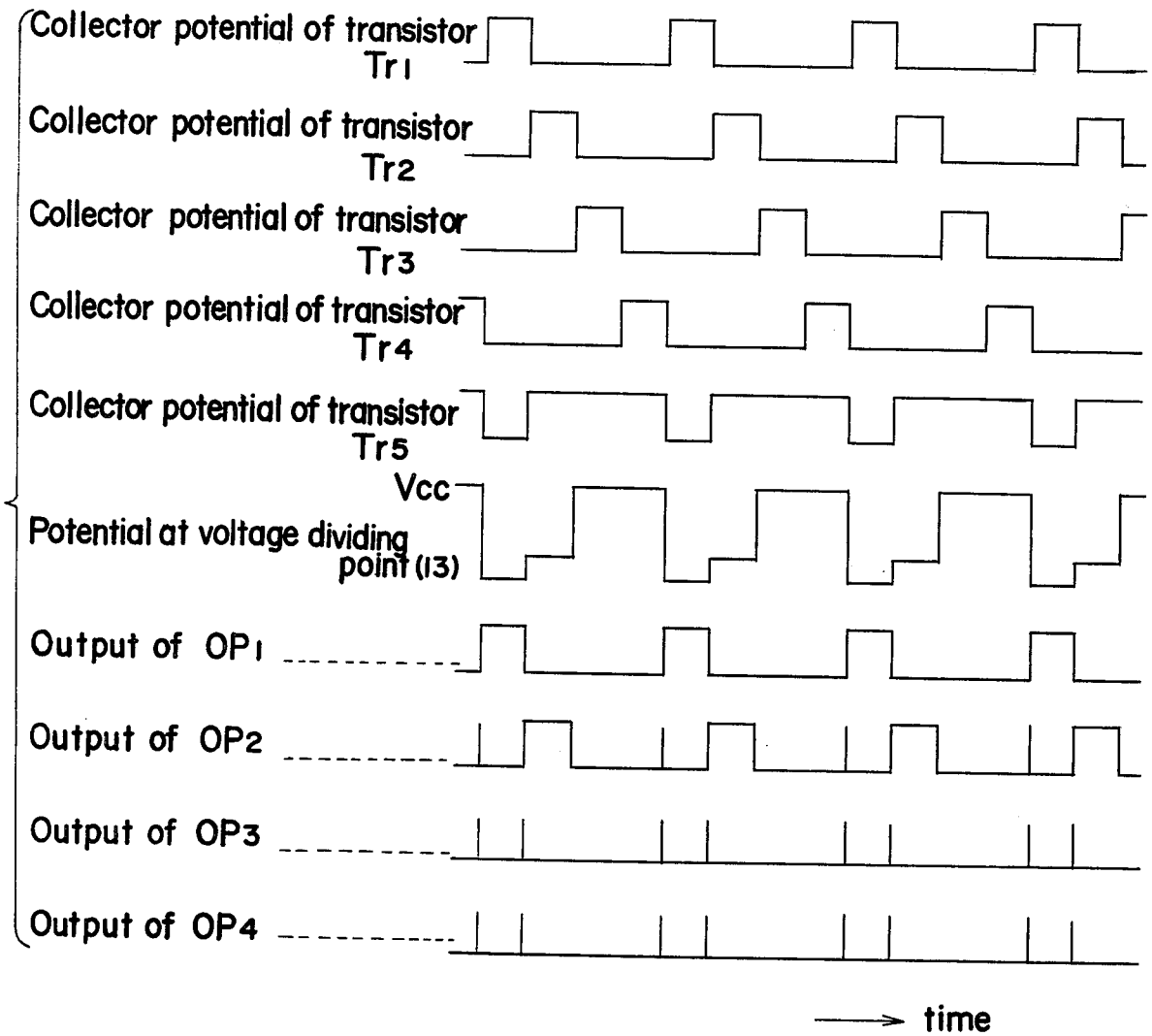
Figure 8:
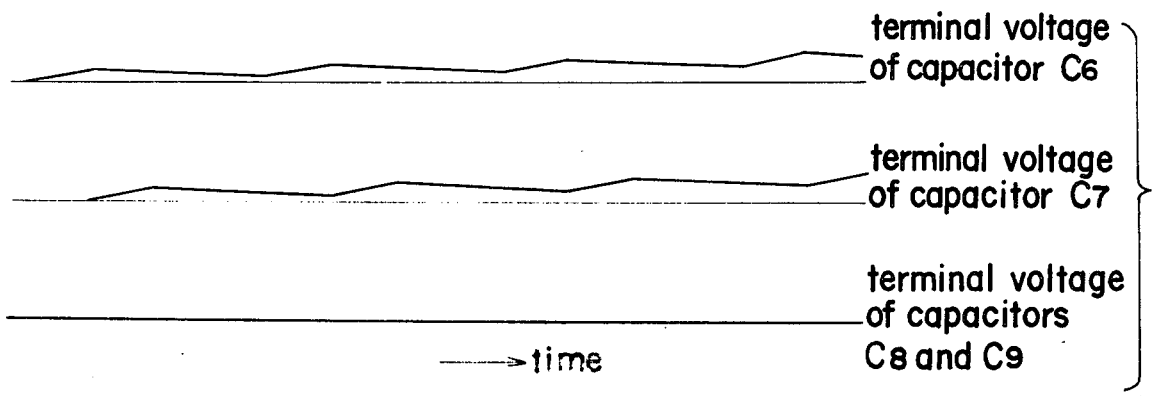

These and other objects and features of the present invention will become apparent from the following description taken in conjunction with the preferred embodiment thereof with reference to the attached drawings in which;

FIGS. 1 and 2 show prior art,

FIG. 3 is an electrical block diagram showing principle of a digital signal transmission system according to the present invention, FIGS. 4(A) and 4(B) show voltage waveforms transmitted by the transmission system of FIG. 3, FIG. 5 is an electrical circuit diagram showing detailed circuit construction of the transmission system of FIG. 3, FIG. 6(A) shows output waveforms of a switching circuit in the circuit of FIG. 5, FIG. 6(B) is a diagram explanatory of set values of comparators of a level discriminating circuit in the cuircuit of FIG. 5, FIG. 7 is a time chart showing collector potentials at each transistor, potential at a voltage dividing point, and also output at each comparator in the circuit of FIG. 5, and FIG. 8 shows waveforms across terminals of capacitors for accumulation in a holding output circuit of the circuit of FIG. 5.

Before the description of the present invention proceeds, it is to be noted that like parts are designated by like reference numerals thoughout several views of the attached drawings.

Referring now to FIG. 3 illustrating principle of the digital signal transmission system of the invention, there is shown an electrical schematic diagram of circuit construction which is applicable in a case where a plurality of channels are required to be taken, although the number of positions or contact points may be small, and in which many switches 5, for example, switches 5a to 5e each coupled to corresponding resistor (not shown) in an encoder 2 are connected in parallel to each other, with the encoder 2 being coupled to an decoder 4 through a signal line 3. By the above arrangement, it becomes possible to identify which particular switches are turned "on" by sequentially switching over (time division) the potential corresponding to "on" condition of each of the switches 5a to 5e.

Referring also to FIGS. 4(A) and 4(B) showing outputs of the encoder 2 and decoder 4 of the circuit of FIG. 3, when the switches, for example, the switches 5b and 5d are turned "on", voltage having level similar to that in FIG. 2 is developed, and waveforms (FIG. 4(A)) obtained by sequential switching over of the same switches 5b and 5d represent the output from the encoder 2, while output pulse waveforms from the decoder 4 to descriminate the presence of signals in the set level are shown in FIG. 4(B). Accordingly, if the above described output pulses are maintained in such a level as is approximately close to that of the repeating frequency of the encoder 2, multiplex transmission can be achieved even in the circuit construction of the voltage division system.

Referring now to FIGS. 5 to 8, there is shown in FIG. 5 a digital signal transmission circuit of multiplex channel type according to one embodiment of the present invention, which circuit generally comprises an encoder section E having a switching circuit 7 operatively coupled to a timing pulse generating circuit 6, and a decoder section D including a level discriminating circuit 8 and a holding output circuit 9 for holding signals from said level discriminating circuit 8, with the encoder section E and the decoder section D being connected through three signal lines 10 to 12, of which the line 10 is a power source line and the line 12 is a ground line.

Still referring to FIG. 5, more specifically, the timing pulse generating circuit 6 includes transistors Tr1 and Tr5 forming an astable multivibrator and transistors Tr2 to Tr4. The base of the transistor Tr5 is connected to the power source line 10 through a resistor R3, and also through series-connected capacitor C2 and resistor R4 whose common junction is connected to the collector of the transistor Tr1, while the collector of the transistor Tr5 is connected to the power source line 10 through a resistor R1 and also through series-connected capacitor C1 and resistor R2, with the junction of the capacitor C1 and the resistor R2 being further connected to the base of the transistor Tr1. The emitter of the transistor Tr5 is connected to a line which leads to the ground line 12 and to which the emitters of the transistors Tr1 and Tr4 are also connected. The collector of the transistor Tr1 is further connected to the power source line 10 through a capacitor C3 and a resistor R5 whose common junction is connected to the base of the transistor Tr2, while the collector of the transistor Tr2 is connected to the power source line 10 through a resistor R6 and also through series-connected capacitor C4 and transistor R7 whose common junction is further connected to the base of the transistor Tr3. Similarly, the collector of the transistor Tr3 is connected to the power source line 10 through a resistor R8 and also through a series-connected capacitor C5 and resistor R9 whose common junction is connected to the base of the transistor Tr4, with the collector of said transistor Tr4 being connected to the power source line 10 through a resistor R10 and also to a base of a transistor Tr9 in the switching circuit 7 through a base resistor R14. In other words, the timing pulse generating circuit 6 comprises the astable multivibrator including the transistors Tr5 and Tr1, the transistor Tr2 which is turned off through reverse biasing by the capacitor C3 upon conduction of the transistor Tr1 and is again turned on after a time period based on the time constant of said capacitor C3 and the resistor R5, the transistor Tr3 which is turned off through the capacitor C4 upon conduction of the transistor Tr2 turned on after a time period according to the time constant of the capacitor C4 and the resistor R7, the transistor Tr4 which is turned off through the capacitor C5 upon conduction of the transistor Tr3 and is turned on after a time period according to the time constant of the capacitor C5 and the resistor R9, and the resistors R2, R4, R6, R8 and R10 functioning as collector resistances, in which construction the following relation can be established.

$$C1R2 = C3R5 = C4R7 = C5R9 = \tfrac{1}{2}C2R3$$

In the switching circuit 7 including transistors Tr6 to Tr8 and the transistors Tr9 mentioned above, the bases of the transistors Tr6 to Tr9 are respectively connected to the collectors of the transistors Tr1 to Tr4 through corresponding base resistors R11 to R14, with emitters of the same transistors Tr6 to Tr9 being connected to the ground line 12. The collectors of the transistors Tr6 to Tr9 are respectively connected to movable contacts of switches SW1 to SW4, while stationary contact of the switch SW1 is directly connected to the signal line 11, with stationary contacts of the switches SW2 to SW4 being also connected through resistors R15 to R17 as voltage dividers to the signal line 11 which is connected to the power source line 10 through a resistor R18 and also coupled to the level discriminating circuit 8 of the decoder D. It is to be noted here that, upon closure of the switch SW1 with the transistor Tr6 turned on, voltage at a voltage dividing point 13 which is one end of the resistor R18 of the level discriminating circuit 8 is of ground potential, and that when the switch SW2 is closed, with the transistor Tr7 turned on, voltage at the voltage dividing point 13 becomes ¼ Vcc. In the similar manner, upon closure of the switch SW3, the voltage at the point 13 is ½ Vcc, while the closure of the switch SW4 makes the voltage at the same point 13 to be ¾ Vcc as shown in FIG. 6(A).

In the level discriminating circuit 8, the ground line 12 is connected to the power source line 10 through a series-connected resistors R23, R22, R21, R20 and R19 for obtaining reference voltages (FIG. 6(B)) set at an intermediate point of each of the voltage levels at the voltage dividing point 13, with junctions of the resistors R23 and R22, R22 and R21, and R20, and R20 and R19 being connected respectively through resistors R25, R27, R30 and R33 to plus input terminals of comparators OP1, OP2, OP3 and OP4 for comparing said reference voltages with signal voltages from the voltage dividing point 13 and for emitting outputs when the signal voltages are lower than the set voltages. The voltage dividing point 13 is further connected to the minus input terminal of the comparator OP1 through a resistor R24, to the minus input terminal of the comparator OP2 through a series-connected resistors R26 and R28, to the minus input terminal of the comparator OP3 through a series-connected resistors R29 and R31, and to the minus input terminal of the comparator OP4 through a series-connected resistors R32 and R34 respectively, while the junction of the resistors R26 and R28 is connected to the output terminal of the comparator OP1 through a diode D1, the junction of the resistors R29 and R31 to the output terminal of the comparator OP2 through a diode D4 and also to the output terminal of the comparator OP1 through a diode D2, and the junction of the resistors R32 and R34 to the output terminal of the comparator OP3 through a diode D6 and also to the output terminal of the comparator OP2 through a diode D5 and further to the output terminal of the comparator OP1 through a diode D3, these diodes D1 to D6 which are respectively connected between the output terminals of the preceeding stages and the input terminals of the subsequent stages of the comparators OP1 to OP4 being for determining priority order of the same comparators OP1 to OP4. The output terminals of the comparators OP1 to OP4 are further coupled, through diodes D7, D8, D9 and D10 respectively, to the holding output circuit 9 mentioned later. The diodes D7 to D10 and the resistors R24 to R34 are for causing capacitors C6 to C9 in the holding circuit 9 to be charged at low impedance and for maintaining the same at high impedance.

In the holding output circuit 9, leads from the diodes D7, D8, D9 and D10 are connected to the bases of transistors Tr10, Tr11, Tr12 and Tr13 through series-connected resistors R35 and R39, R36 and R41, R37 and R43 and R38 and R45 respectively, while the collectors of the same transistors Tr10, Tr11, Tr12 and Tr13 are connected to +Vcc of the power source line 10 through loads L1, L2, L3 and L4 such as relays, lamps and the like. The emitters of the transistors Tr10, Tr11, Tr12 and Tr13 are respectively connected to a ground line from the line 12 to the ground, while the bases of the transistors Tr10 to Tr13 are also connected to the same ground line from the line 12 through resistors R40, R42, R44 and R46 respectively. The junctions of the resistors R35 and R39, R36 and R41, R37 and R43, and R38 and R45 are connected to the ground line from the line 12 through capacitors C6, C7, C8 and C9 respectively. The outputs from the comparators OP1 to OP4 through the diodes D7 to D10 of the level discriminating circuit 8 are charged into the capacitors C6 to C9 respectively through time constant of the resistors R35 to R38, and when the terminal voltages of each of the capacitors C6 to C9 reach predetermined levels, the corresponding transistors Tr10 to Tr13 having the loads L1 to L4 for collector resistances thereof are turned on.

By the above arrangement, when the astable multivibrator of the timing pulse generating circuit 6 is caused to start oscillation with the transistors Tr1 and Tr5 turned on or off, the collector potentials of the transistors Tr1 to Tr5 are as shown in FIG. 7. More specifically, when the transistor Tr1 is turned on, the transistor Tr2 biased in the reverse direction through the capacitor C3 is turned off, and is again turned on after a period of time determined by the time constant of the capacitor C3 and the resistor R5. Accordingly, the collector potential of the transistor Tr2 is as shown in FIG. 7, while the collector potentials of the transistors Tr3 and Tr4 respectively show output waveforms as in FIG. 7. As the transistors Tr1 to Tr4 are sequentially turned off, the transistors Tr6 to Tr9 in the switching circuit 7 are also brought into the state ready to be turned on, at which time, when the switch SW1 is closed, the transistor Tr6 is turned on, with the current flowing through the resistor R18, switch SW1 and the collector-emitter circuit of the transistor Tr6, thus reducing the potential at the voltage dividing point 13 to the ground potential level. Meanwhile, if the switch SW2 is closed when the transistor Tr2 is turned off, the transistor Tr7 is turned on, with the current flowing through the resistors R18 and R15, the switch SW2 and the collector-emitter circuit of the transistor Tr7, while the potential at the voltage dividing point 13 becomes voltage depending on the dividing ratio of the resistors R18 to R15, for example, $\frac{1}{4}$ Vcc. Similarly, when the transistors Tr3 and Tr4 are turned off, with the transistors Tr8 and Tr9 rendered to be on, the potential at the voltage dividing point 13 is approximately Vcc through opening of the switches SW3 and SW4. The waveform of the voltage at the voltage dividing point 13 is also shown in FIG. 7.

The voltage appearing at the voltage dividing point 13 is applied to one of the input side of each of the comparators OP1 to OP4 in the level discriminating circuit 8, while voltage developed by the resistance division of the resistors R19 to R23 is being impressed to the other of the input side of each of the same comparators OP1 to OP4. More specifically, the other input terminal of the comparator OP1 is being impressed with voltage of $\frac{1}{8}$ Vcc, that of the comparator OP2 with $\frac{3}{8}$ Vcc, that of the comparator OP3 with $\frac{5}{8}$ Vcc and that of the comparator OP4 with $\frac{7}{8}$ Vcc respectively.

In the above state, when the transistor Tr1 of the timing pulse generator 6 is turned on, with the transistor Tr6 rendered conducting, signal output voltage of zero level is applied to each of the comparators OP1 to OP4, in which case, since the set voltage of each of the comparators OP1 to OP4 is higher than the signal output voltage, outputs of high level are developed from all of the comparators OP1 to OP4. It should be noted here in this case that since the signal of high level (voltage approximately close to Vcc) developed from the comparator OP1 is applied to one of the input terminal (i.e., the input side connected to the voltage dividing point 13) of the comparators OP2 to OP4 respectively through the diodes D1 to D3, the output terminal of each of the comparators OP2 to OP4 momentarily rendered to be of high level is altered to be of low level at the subsequent moment, with output therefrom being suspended. Accordingly, the high level output only from the comparator OP1 is sent out, with the current flowing into the holding output circuit 9 through the diode D7 and into the capacitor C6 through the resistor R35 as charging current for said capacitor C6.

Subsequently, when the transistor Tr2 of the timing pulse generating circuit 6 is turned on, with the transistor Tr7 rendered conducting, the voltage of $\frac{1}{4}$ Vcc is applied to each of the comparators OP1 to OP4, in which case, however, no output is developed from the comparator OP1, since the set voltage of the comparator OP1 is $\frac{1}{8}$ Vcc, whereas outputs of high level are sent out from the comparators OP2 to OP4, because the set voltages of the comparators OP2 to OP4 are higher than $\frac{1}{4}$ Vcc. Meanwhile, since the high level signal developed from the comparator OP2 is applied to one of the input terminal of each of the comparators OP3 and OP4 through the diodes D4 and D5, the outputs from each of said comparators OP3 and OP4 are suspended. Accordingly, the output of high level is developed only from the comparator OP2, with the current flowing into the holding output circuit 9 through the diode D8 and into the capacitor C7 through the resistor R36 as charging current for said capacitor C7.

Furthermore, when the transistors Tr3 or Tr4 of the timing pulse generator 6 is sequentially turned on, the voltage of Vcc is applied to each of the comparators OP1 to OP4 in either case, in which state, however, no output is developed from the comparators OP1 to OP4, since the set voltage of each of the comparators OP1 to OP4 is lower than the voltage Vcc as the signal voltage.

When the transistor Tr1 is again turned on, the output is sent out only from the comparator OP1 in the similar manner as described earlier, whereas if the transistor Tr2 is turned on, the output only from the comparator OP2 is sent out, with amount of charge in the respective capacitors C6 and C7 increasing, while the capacitors C8 and C9 are not charged at all, thus terminal voltages of the capacitors C6 to C9 becoming as shown in FIG. 8. When the terminal voltages of the capacitors C6 and C7 are raised sufficiently high, the transistors Tr10 and Tr11 are turned on for energizing the loads L1 and L2. Accordingly, it is possible to detect which of the switches are closed at a distant place.

It is to be noted here that, in the foregoing embodiment, although the function of the digital signal transmission circuit is described with reference to the case where the switches SW1 and SW2 are closed, the loads L3 and L4 are energized in the similar manner as above in the case where the switches SW3 and SW4 are closed.

It should also be noted that although the digital signal transmission circuit of the invention is described for detection of the closed ones of the four switches in the foregoing embodiment, the number of switches is not limited to four, but may be decreased or increased depending on the necessity, and that the signals dealt with by the circuit of the invention are not limited to on and off signals of switches, but any other signals may be transmitted provided that these are of digital signals.

As is clear from the foregoing description, according to the digital signal transmission system of the present invention, the digital signals sequentially sent out from the encoder side are compared with set values in each of the comparators at the decoder side, for sending out signals from the comparators when the values of the digital signals are larger than the values set in the comparators and for suspending signals from all of the comparators if the values of the digital signals are smaller than those set in the comparators, while output from the comparator having the set value nearest to the signal value is utilized for inverting other comparators so as to suspend outputs from the latter comparators, thus synchronization between the encoder and the decoder being made unnecessary. Accordingly, signals are positively transmitted with the equipment of simple construction which is hardly affected by noises and which can be manufactured at low cost.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. A system for transmission of digital signals comprising
    timing pulse generator means for generating sequential timing pulse signals in a repetitive time frame and for applying the generated timing pulse signals only to a switching means;
    a multiplex highway for carrying voltage signals;
    a plurality of voltage signal generating means each capable of selectively generating a respective voltage signal of different voltage level;
    said switching means being responsive to said sequential timing pulse signals for sequentially connecting said voltage signal generating means to one end of said multiplex highway; and
    decoding means connected to the other end of said multiplex highway for detecting the level of the voltage signals received on said multiplex highway, said decoding means operating independently of said timing pulse generator means.

2. A system for transmission of digital signals as defined in claim 1 wherein said plural voltage signal generating means each include a selectively operable switch connected between said switching means and said one end of said multiplex highway.

3. A system for transmission of digital signals as defined in claim 2 wherein said switching means comprises a plurality of transistors each connected in series with a respective one of said selectively operable switches and being rendered operative in response to a respective one of said timing pulse signals.

4. A system for transmission of digital signals as defined in claim 1 wherein said decoding means includes a plurality of comparators each having a first input connected to said other end of said multiplex highway and a second input connected to receive a respective reference voltage, said comparators providing an output when the voltage at said second input exceeds the voltage at said first input.

5. A system for transmission of digital signals as defined in claim 4 wherein said decoding means further includes inhibiting means connected to said comparators for permitting only the one of said comparators whose reference voltage is closest in value to the voltage signal received on said multiplex line to produce an output.

6. A system for transmission of digital signals as defined in claim 5 wherein said comparators are interconnected in the order of increasing reference voltage level by said inhibiting means which connects the output of said comparators to each first input only of the comparators connected subsequent thereto in the order of increasing reference voltage.

7. A system for transmission of digital signals comprising
    timing pulse generator means for generating sequential timing pulse signals in a repetitive time frame;
    a multiplex highway for carrying data signals;
    a voltage source connected to one end of said multiplex highway through an impedance;
    a plurality of switch circuits connected in parallel to the other end of said multiplex highway, each switch circuit including in series a first selectively operable switch, a second switch responsive to a respective one of said sequential timing pulse signals and means for adjusting the voltage drop across said switch circuit to a level different from that of the other switch circuits; and decoding means connected to said one end of said multiplex highway for detecting the level of the voltage carried by said multiplex highway to identify the first switches in said swtich circuits which are selectively operated, said timing pulse generator means and said decoding means operating independently of said timing pulse generator and said timing pulse generator means applying the generated timing pulse signals only to said second switches.

8. A system for transmission of digital signals as defined in claim 7 wherein said second switches in each switch circuit are transistor switches connected to said timing pulse generator means so as to be operated in response to receipt of a respective timing pulse whereby said switch circuits are enabled in sequence during each time frame.

9. A system for transmission of digital signals as defined in claim 7 wherein said decoding means includes a plurality of comparators each having a first input connected to said one end of said multiplex highway and a second input connected to receive a respective reference voltage, said comparators providing an output when the voltage at said second input exceeds the voltage at said first input.

10. A system for transmission of digital signals as defined in claim 9 wherein said decoding means further includes inhibiting means connected to said comparators for permitting only the one of said comparators whose reference voltage is closest in value to the voltage signal received on said multiplex line to produce an output.

11. A system for transmission of digital signals as defined in claim 10 wherein said comparators are interconnected in the order of increasing reference voltage level by said inhibiting means which connects the output of said comparators to each first input only of the comparators connected subsequent thereto in the order of increasing reference voltage.

12. A method of transmission of digital signals on a multiplex highway comprising the steps of sequentially applying to one end of said multiplex highway a plurality of digital signals whose voltage levels differ from one another, with said digital signals in time correspondence with a plurality of sequential time pulse signals;

comparing the digital signals received at the other end of said multiplex highway with each of a plurality of reference voltages of different level which are correlated to the levels of said digital signals; and identifying the reference voltage which compares most closely with the received digital signal, wherein the comparing and identifying steps are performed independently of the sequential time pulse signals.

13. A method as defined in claim 12 wherein each of said reference voltages have a level slightly lower than a corresponding one of said digital signals, and said step of identifying the reference voltage which compares most closely with the received digital signal comprises first selecting all reference voltage which are exceeded in level by the received digital signal, and then selecting the first of those selected reference voltages exceeded by the received digital signal.

* * * * *